United States Patent
Lim et al.

(10) Patent No.: US 8,660,589 B2
(45) Date of Patent: Feb. 25, 2014

(54) APPARATUS AND METHOD FOR OPERATING AN IDLE MODE IN A WIRELESS COMMUNICATION SYSTEM

(75) Inventors: Ae-Ri Lim, Suwon-si (KR); Young-Hak Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1060 days.

(21) Appl. No.: 12/139,925

(22) Filed: Jun. 16, 2008

(65) Prior Publication Data

US 2008/0311933 A1   Dec. 18, 2008

(30) Foreign Application Priority Data

Jun. 15, 2007   (KR) .................. 10-2007-0058862

(51) Int. Cl.
*H04W 68/00*   (2009.01)
*H04M 1/68*   (2006.01)
*G08C 17/00*   (2006.01)
*H04W 4/00*   (2009.01)

(52) U.S. Cl.
USPC ........... 455/458; 455/411; 455/410; 370/311; 370/330

(58) Field of Classification Search
USPC ................................. 455/411, 458
See application file for complete search history.

(56) References Cited

U.S. PATENT DOCUMENTS

2005/0250474 A1* 11/2005 Hong et al. .................. 455/411
2006/0089161 A1*  4/2006 Kim et al. .................... 455/458

FOREIGN PATENT DOCUMENTS

| JP | 2004-247801 | 9/2004 |
| JP | 2008-508779 | 3/2008 |
| WO | WO 2006/073228 | 7/2006 |

OTHER PUBLICATIONS

Shantidev Mohanty et al., "A Novel Algorithm for Efficient Paging in Mobile WIMAX", Mobile WIMAX Symposium 2007, IEEE, Mar. 25-29, 2007.
"Part 16: Air Interface for Fixed and Mobile Broadband Wireless Access Systems", Feb. 28, 2006.
Specifications for 2.3GHz Band Portable Internet Service, TTA Standard, TTAS.K0-06.0082/R1, Dec. 21, 2005.

* cited by examiner

*Primary Examiner* — James Wozniak
*Assistant Examiner* — Kuo Woo
(74) *Attorney, Agent, or Firm* — The Farrell Law Firm, P.C.

(57) ABSTRACT

An apparatus and method for operating an idle mode in a wireless communication system. The method includes transmitting, by a Mobile Station (MS) to a Base Station (BS), a RaNGing REQuest (RNG-REQ) message for changing a paging cycle while operating the idle mode; transmitting, by the BS to the MS, a RaNGing ReSPonse (RNG-RSP) message including paging information to be changed; and operating a new idle mode by the MS and the BS according to the paging information transmitted and received while operating the idle mode.

31 Claims, 6 Drawing Sheets

# APPARATUS AND METHOD FOR OPERATING AN IDLE MODE IN A WIRELESS COMMUNICATION SYSTEM

PRIORITY

This application claims priority under 35 U.S.C. §119(a) to a Korean patent application filed in the Korean Intellectual Property Office on Jun. 15, 2007 and assigned Serial No. 2007-58862, the entire disclosure of which is herein incorporated by reference.

BACKGROUND OF THE INVENTION

1. Field of the Invention

The present invention relates to an apparatus and method for operating an idle mode in a wireless communication system. More particularly, the present invention relates to an apparatus and method for changing a paging cycle while operating an idle mode of a Mobile Station (MS) for effective resource management and reduced power consumption.

2. Description of the Related Art

In broadband wireless communication systems, an idle mode is provided to reduce power consumption in a Mobile Station (MS) and also to effectively manage resources used in a Base Station (BS).

In an idle mode, monitoring is only periodically performed on a broadcast channel when the MS is not registered to a specific BS. The idle mode is operated when transmitted and received traffic of the MS is not generated for more than a predetermined time duration. That is, when in the idle mode, actions required to operate a normal mode (e.g., periodic ranging, channel monitoring, reporting, and handover) are not performed. Instead, an active state is maintained in which the monitoring is performed only in a predetermined interval. Therefore, power consumption can be reduced and the BS can more effectively use resources. In order to manage MSs, after entering the idle mode, the MSs are grouped such that the MSs existing within the same paging zone are included in one group.

FIG. 1 illustrates a method of operating an idle mode in a conventional wireless communication system. Referring to FIG. 1, an MS 100 transmits a De-REGistration REQuest (DREG-REQ) message to a BS 102 in step 110. The BS 102 transmits a De-REGistration CoMmanD (DREG-CMD) message to the MS 100 in step 112. Thereafter, the MS 100 enters the idle mode in step 114.

After entering the idle mode, the MS 100 operates the idle mode by using a paging cycle 116. The paging cycle 116 is determined by transmitting and receiving the DREG-REQ message and the DREG-CMD message. The paging cycle 116 includes a paging interval 118 and a paging unavailable interval 120. The paging interval 118 represents a time duration during which the MS 100 is synchronized with the BS 102 in the downlink and decodes a broadcast paging message. The paging unavailable interval 120 represents a time duration during which the MS 100 performs a power-down operation and consequently, a downlink service is not ensured.

In the idle mode, the paging unavailable interval 120 should be short in order for the MS 100 to rapidly respond to traffic. However, the paging unavailable interval 120 should be long in order to increase power efficiency. Therefore, when the idle mode is operated according to a fixed paging cycle provided in the conventional wireless communication system, it is difficult to obtain both the power savings and the rapid response to the traffic.

The conventional wireless communication system provides a method of changing a paging cycle to achieve the power savings of the MS or the rapid response to the traffic. In this method, inconveniently, the MS in the idle mode transitions to a normal mode, and thereafter, re-enters the idle mode by re-transmitting and receiving the DREG-REQ and the DREG-CMD messages.

In addition, the method of changing the paging cycle, after allowing the MS to transition from the idle to the normal mode, is ineffective in terms of resource utilization of the BS when the number of available MSs is limited.

SUMMARY OF THE INVENTION

Accordingly, the present invention has been designed to solve at least the above-mentioned problems and/or disadvantages, and to provide at least the advantages described below. An aspect of the present invention is to provide an apparatus and method for operating an idle mode in a wireless communication system.

Another aspect of the present invention is to provide an apparatus and method for changing a paging cycle while operating an idle mode for effective resource management, rapid response to traffic, and power savings.

Another aspect of the present invention is to provide an apparatus and method for changing a paging cycle by using a ranging message, while operating an idle mode of a Mobile Station (MS) in a wireless communication system.

In accordance with an aspect of the present invention, a method of operating an idle mode of an MS in a wireless communication is provided. The method includes transmitting, by the MS, to a Base Station (BS) a RaNGing REQuest (RNG-REQ) message for changing a paging cycle, while operating the idle mode; transmitting, by the BS, to the MS a RaNGing ReSPonse (RNG-RSP) message including paging information to be changed; and operating a new idle mode, by the MS and the BS, according to the paging information transmitted and received while operating the idle mode.

In accordance with another aspect of the present invention, a method of operating an MS that operates an idle mode in a wireless communication system is provided. The method includes transmitting, to a BS, an RNG-REQ message for changing a paging cycle while operating the idle mode; receiving, from the BS, an RNG-RSP message including paging information to be changed; and operating a new idle mode according to the paging information received while operating the idle mode.

In accordance with another aspect of the present invention, a method of operating a BS in an idle mode of an MS in a wireless communication system is provided. The method includes receiving an RNG-REQ message for changing a paging cycle from the MS that is operating the idle mode; transmitting, to the MS, an RNG-RSP message including paging information indicating a paging cycle to be changed; and operating the idle mode of the MS according to the paging information.

In accordance with another aspect of the present invention, an MS apparatus for operating an idle mode in a wireless communication system is provided. The apparatus includes a controller for evaluating a condition for changing a paging cycle while operating the idle mode, for controlling an RNG-REQ message to be transmitted to a BS according to the condition, and for operating the idle mode by evaluating paging information included in an RNG-RSP message received from the BS; and a communication module for transmitting the RNG-REQ message to the BS under the control of the controller, for receiving the RNG-RSP message from the BS, and for providing the RNG-RSP message to the controller.

In accordance with another aspect of the present invention, a BS apparatus for operating an idle mode of an MS in a wireless communication system is provided. The apparatus includes a message processor for providing a an RNG-REQ message received from the MS to network apparatus, for receiving control information from the network apparatus, and for preparing an RNG-RSP message or a MOBile PAGing ADVertisement (MOB_PAG_ADV) message to be delivered to the MS; and a communication module for transmitting and receiving messages to and from the MS.

In accordance with another aspect of the present invention, a network apparatus for operating an idle mode of an MS in a wireless communication system is provided. The apparatus includes a controller for determining to change paging information of the MS, which is operating the idle mode, according to a condition for changing a paging cycle or according to a request of the MS, and for operating the idle mode of the MS; and a network communication module for delivering information for transmitting an MOB_PAG_ADV message to a BS in a paging group.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail because they would obscure the invention in unnecessary detail.

Hereinafter, an apparatus and method for changing a paging cycle by transmitting and receiving a ranging message while operating an idle mode of a Mobile Station (MS) in a wireless communication system will be described.

Figure 1:
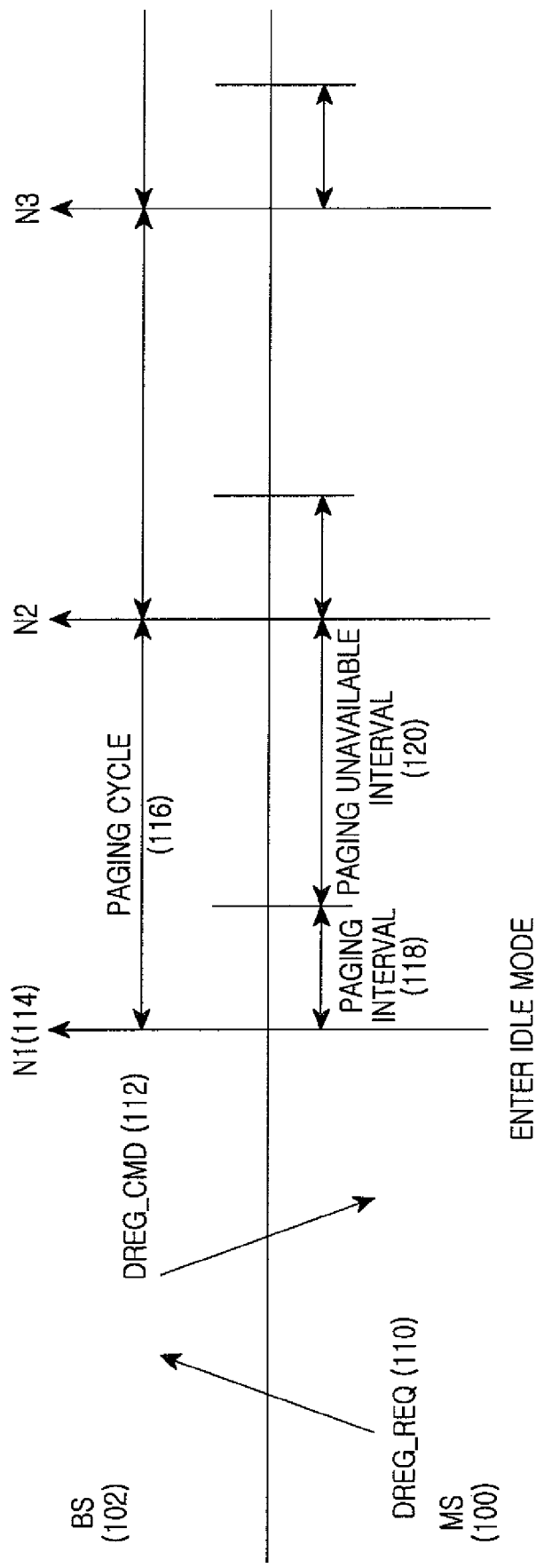
FIG. 1 illustrates a method of operating an idle mode in a conventional wireless communication system.
Figure 2:
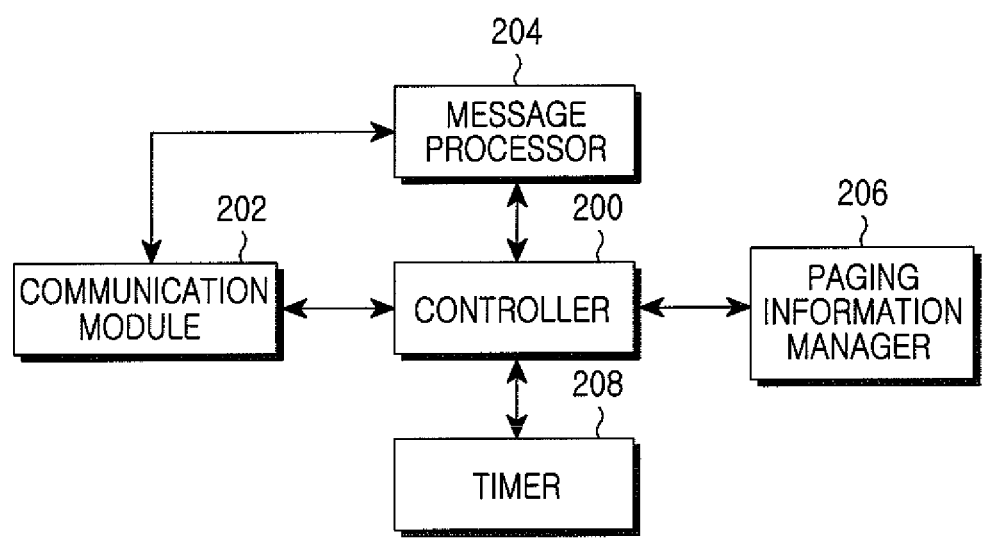
FIG. 2 is a block diagram of a Mobile Station (MS) in a wireless communication system according to an embodiment of the present invention.

FIG. 2 is a block diagram of an MS in a wireless communication system according to an embodiment of the present invention. The MS includes a controller 200, a communication module 202, a message processor 204, a paging information manager 206, and a timer 208.

Referring to FIG. 2, the controller 200 provides overall control for voice call and data communication of the MS. Further, the controller 200 controls the MS to enter the idle mode when traffic for the MS is not generated for a predetermined time duration, and therefore, processes and controls an action of entering the idle mode from a normal mode. More specifically, the controller 200 transmits a signal for generating a De-REGistration REQuest (DREG-REQ) message to the message processor 204 in order to enter the idle mode. Further, the controller 200 evaluates paging information from a De-REGistration CoMmanD (DREG-CMD) message received from the message processor 204 and then stores the paging information in the paging information manager 206. Furthermore, the controller 200 processes and controls an action of operating the idle mode according to the evaluated paging information. The paging information may be a paging cycle, a paging offset, a paging group IDentifier (ID), etc.

Upon entering the idle mode, the controller 200 activates the timer 208 and controls the communication module 202 by identifying a paging interval and a paging unavailable interval according to the paging cycle. In addition, the controller 200 determines if the paging cycle needs to be changed according to the present invention, and therefore, processes and controls an action of changing the paging cycle. The controller 200 may determine that the paging cycle needs to be changed when traffic for the MS is not generated while the paging cycle is repeated more than a predetermined number of times or when the power consumption of the MS needs to be reduced.

To change the paging cycle, the controller 200 transmits a signal to the message processor 204, requesting the generation of a RaNGing REQuest (RNG-REQ) message used to request the change of the paging cycle. Then, the controller 200 receives a RaNGing ReSPonse (RNG-RSP) message from the message processor 204 and evaluates the changed paging cycle. Thereafter, the controller 200 processes and controls an action of operating the idle mode according to the changed paging cycle.

The communication module 202 receives a signal from a Base Station (BS) and provides the signal to the message processor 204. Further, the communication module 202 transmits a signal received from the message processor 204 to the BS. In particular, according to as embodiment of the present invention, the communication module 202 operates the idle mode under the control of the controller 200. More specifically, under the control of the controller 200, during the paging interval in the paging cycle, the communication module 202 monitors a broadcast channel and determines if a paging message exists. In addition, during the paging unavailable interval in the paging cycle, the communication module 202 stops its operation in order to reduce power consumption.

The paging information manager 206 stores and manages information required to operate the idle mode of the MS. The timer 208 measures the paging cycle under the control of the controller 200 when the idle mode of the MS is operated, i.e., the timer 208 measures the paging interval and the paging unavailable interval in the paging cycle.

The message processor 204 processes a signal received from the communication module 202, and provides the signal to the controller 200. Further, the message processor 204 receives from the controller 200 a request signal for message generation, generates a relevant message, and provides the message to the communication module 202. More specifically, when the signal received from the controller 220 requests the generation of the DREG-REQ message, the message processor 204 generates the DREG-REQ by using a message format, for example, as shown in Table 1 below. In addition, when the signal received from the communication module 202 requests the generation of the DREG-CMD message having a format, for example, as shown in Table 2 below, the message processor 204 decodes the received DREG-CMD message and provides the DREG-CMD message to the controller 200. The message processor 204 may transmit and receive paging information for operating the idle mode by using Type Length Value (TLV) items, for example, as shown in Table 3 below.

Table 1 below shows a format of the DREG-REQ message transmitted from the MS to the BS so the MS switches to the idle mode.

TABLE 1

| Syntax | Size | Notes |
|---|---|---|
| DREG-REQ message format ( ){ | | |
| Management message type = 49 | 8 bits | |

TABLE 1-continued

| Syntax | Size | Notes |
|---|---|---|
| De-registration_Request_Code | 8 bits | 0x00 = SS De-Registration request from BS<br>0x01 = request for MS De-Registration from serving BS and initiation of MS Idle Mode<br>0x02 = Response for the Unsolicited MS De-Registration initiated by the BS. |
| TLV encoded parameters<br>} | | |

As shown in Table 1 above, the MS can set a de-registration request code of the DREG-REQ message to 0x01 and transmit the de-registration request code to the BS. Accordingly, the MS can request the BS to allow the MS to switch to the idle mode.

Table 2 below shows a format of the DREG-CMD message transmitted from the BS to the MS so that the MS switches to the idle mode.

TABLE 2

| Syntax | Size | Notes |
|---|---|---|
| DREG-CMD_Message_Format( )<br>{ | | |
| Management Message Type = 29 | 8 bits | |
| Action Code | 8 bits | . . .<br>0x05 = MS shall immediately begin de-registration from serving BS and request initiation of MS Idle Mode.<br>0x06 = The MS may retransmit the DREG-REQ message after the time duration (REQ-duration) provided in the message.<br>0x07 = The MS shall not retransmit the DREG-REQ message and shall wait the DREG-CMD message. BS transmittal of a subsequent DREG-CMD with Action Code 03 shall cancel this restriction. |
| TLV encoded parameters<br>} | | |

As shown in Table 2 above, by using an action code included in the DREG-CMD message, the BS indicates whether the MS is allowed to switch to the idle mode.

Table 3 below shows TLV items included in the DREG-REQ message and the DREG-CMD message.

TABLE 3

| Name | Type | Length | Value |
|---|---|---|---|
| Paging Information | 1 | 5 | Bits 15:0 - Paging cycle - Cycle in which the paging message is transmitted within the paging group<br>Bits 23:16 - Paging offset - Determines the frame within the cycle in which the paging message is transmitted. Must be smaller than Paging cycle value<br>Bits 39:24 - Paging group ID - ID of the paging group the MS is assigned to |
| REQ-duration | 2 | 1 | |
| Paging Controller ID | 3 | 6 | |
| MAC Hash Skip Threshold | 5 | 2 | |
| Idle Mode Retain Information | 4 | 1 | |
| Paging cycle request | 52 | 2 | Requested Cycle in which the paging message is transmitted within the paging group. |

The DREG-REQ message and the DREG-CMD message may indicate a paging group ID, a paging cycle, and a paging offset which need to be maintained by the MS while in the idle mode by using the TLV items shown in Table 3 above.

In addition, under the control of the controller 200, the message processor 204 generates a first RNG-REQ message by using TLV items, for example, as shown in Table 4 below. Thereafter, the message processor 204 generates a second RNG-REQ message for requesting the change of the paging cycle by allowing the first RNG-REQ message to include a paging cycle request TLV of Table 5 below or by using a ranging purpose indication TLV.

Table 4 below shows TLV items included in the RNG-REQ message or the RNG-RSP message.

TABLE 4

| Name | Type | Length | Value |
|---|---|---|---|
| Ranging Purpose Indication | 6 | 1 | Bit #0: HO indication (when this bit is set to 1 in combination with other included information elements indicates the MS is currently attempting to HO or Network Re-entry from Idle Mode to the BS) Bit #1: Location Update Request (when this bit is set to 1, it indicates MS action of Idle Mode Location Update Process) Bits 2-7: Reserved |
| Location Update Response | 23 | 1 | 0X00 = Failure of Location Update. The MS shall perform Network Re-entry from Idle Mode 0x01 = Success of Location Update 0x10, 0x11: Reserved |
| Paging Controller ID | 25 | 6 | |
| MAC Hash Skip Threshold | 28 | 2 | |
| Paging Information | 24 | 5 | Paging Information shall only be included if Location Update Response = 0x01 and if Paging Information has changed Bits 15:0 - PAGING_CYCLE - Cycle in which the paging message is transmitted within the paging group Bits 23:16 - PAGING OFFSET - Determines the frame within the cycle in which the paging message is transmitted. Must be smaller than PAGING CYCLE value Bits 39:24 - Paging Group ID - ID of the paging group the MS is assigned to |

Herein, the raging purpose indication TLV is used for a location update request, and a location update response TLV indicates whether location update is successful or not. The paging information is used to indicate the paging group ID, the paging cycle, and the paging offset of the MS.

Table 5 below shows TLV items added to the RNG-REQ message according to the present invention.

TABLE 5

| Name | Type | Length | Value |
|---|---|---|---|
| Paging cycle request | X | 2 | Requested Cycle in which the paging message is transmitted within the paging group. |

In Table 5 above, the paging cycle request TLV is set so that the MS requests the BS to change the paging cycle while operating the idle mode according to the present invention. By enabling the RNG-REQ message to include the paging cycle request TLV, which is set to a paging cycle value to be changed, the MS can request the BS to change the paging cycle.

Table 6 below shows a usage of the ranging purpose indication TLV of the RNG-REQ message according to the present invention.

TABLE 6

| Name | Type | Length | Value |
|---|---|---|---|
| Ranging Purpose Indication | 6 | 1 | Bit #0: HO indication (when this bit is set to 1 in combination with other included information elements indicates the MS is currently attempting to HO or Network Re-entry from Idle Mode to the BS) Bit #1: Location Update Request (when this bit is set to 1, it indicates MS action of Idle Mode Location Update Process) Bit #2: Change Request of Paging cycle (when this bit is set to 1, it indicates MS request of changing paging cycle) Bits #3-7: Reserved |

As shown in Table 6 above, the present invention defines a third bit (i.e., Bit #2) of the ranging purpose indication TLV among TLV items of the RNG-REQ message for the purpose of requesting the change of the paging cycle. That is, according to an embodiment of the present invention, the MS can indicate that the MS requests the BS to change the paging cycle, by using the third bit of the ranging purpose indication TLV.

Upon receiving a MOBile PAGing ADVertisement (MOB_PAG_ADV) message from the BS, the message processor 204 evaluates an action code included in the MOB_PAG_ADV message, evaluating whether the MOB_PAG_ADV message is a message for allowing location update. As shown in Table 7 below, for example, if the MOB_PAG_ADV message includes an action code for allowing location update, in response thereto, the message processor 204 generates an RNG-REQ message for location update and transmits the generated RNG-REQ message to the communication module 202.

Table 7 below shows a format of the MOB_PAG_ADV message.

TABLE 7

| Syntax | Size | Notes |
|---|---|---|
| MOB_PAG-ADV_Message_Format( ) { | | |
| Management Message Type = 62 | 8 bits | |
| Num_Paging_Group_IDs | 8 bits | |
| For (i=0; i <Num_Paging_Group_IDs; i++) { | | |
| Paging Group ID | 16 bits | |
| } | | |
| Num_MACs | 8 bits | |
| For (j=0; j<Num_MACs; j++) { | | |
| MS MAC Address hash | 24 bits | |
| Action Code | 2 bits | Paging action instruction to MS<br>0b00 = No Action Required<br>0b01 = Perform Ranging to establish location and acknowledge message<br>0b10 = Enter Network<br>0b11 = Reserved |
| Reserved | 6 bits | |
| }<br>padding<br>TLV Encoded Information<br>} | | |

As shown in Table 7 above, a paging controller and the BS may set the action code to 0b01 in the MOB_PAG_ADV message so as to allow the MS to transmit the RNG-REQ message.

Figure 3:
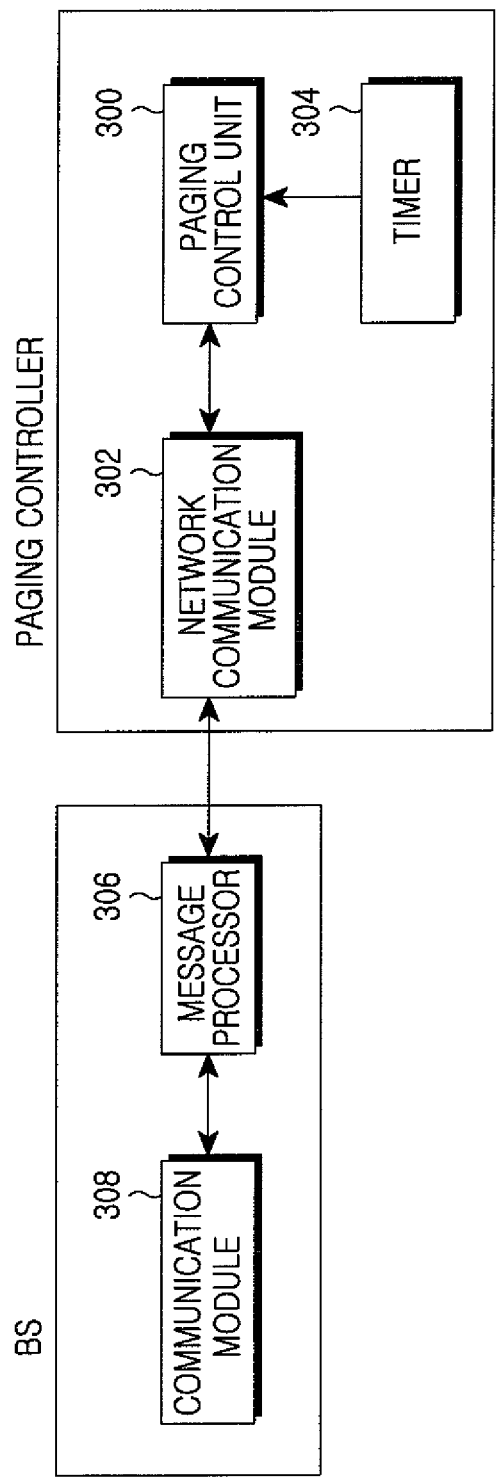
FIG. 3 is a block diagram illustrating a paging controller and a Base Station (BS) in a wireless communication system according to an embodiment of the present invention.

FIG. 3 is a block diagram illustrating a paging controller and a BS in a wireless communication system according to an embodiment of the present invention. The paging controller includes a paging control unit 300, a timer 304, and a network communication module 302. The BS includes a communication module 308 and a message processor 306.

Referring to FIG. 3, the paging control unit 300 of the paging controller manages and operates MSs in an idle mode by grouping the MSs located in the same paging zone into one or more paging information groups. The paging control unit 300 supports a plurality of paging patterns, i.e., paging cycles and paging offsets. Therefore, different paging cycles and different paging offsets can be respectively assigned to the MSs belonging to the same paging group. The paging patterns can be determined according to a network policy. There is no restriction on the paging patterns.

The paging control unit 300 of the paging controller changes or manages the paging patterns for the respective MSs in the idle mode according to a policy for each pattern. Alternatively, the paging control unit 300 controls and processes the paging patterns according to a traffic characteristic of each MS by using the timer 304. The paging control unit 300 determines whether there is a need to change a paging cycle of an MS in the idle mode then controls and processes a function for changing the paging cycle of the MS. Whether to change the paging cycle or not may be determined by considering the traffic characteristic of each MS in the idle mode or by considering a resource management aspect. A condition for determining the need to change the paging cycle may vary according to a design rule. If it is determined that a paging cycle of a specific MS needs to be changed, the paging control unit 300 controls and processes a function for transmitting an MOB_PAG_ADV message during a paging interval of the specific MS.

An RNG-REQ message is received through the communication module 308 of the BS and is delivered to the network communication module 302 of the paging controller through the message processor 306. Upon receiving the RNG-REQ message for requesting the change of the paging cycle of the specific MS through the network communication module 302, in response thereto, the paging control unit 300 controls and processes a function for generating and transmitting an RNG-RSP message including the paging cycle to be changed. Even if the RNG-REQ message does not request the change of the paging cycle, the paging control unit 300 may allow the RNG-RSP message to include the paging cycle to be changed.

The communication module 308 of the BS receives a signal from the MS and provides the signal to the message processor 306. Further, the communication module 308 transmits to the MS a signal received from the message processor 306. Furthermore, the message processor 306 of the BS provides information received from the MS to the network communication module 302 of the paging controller, and delivers to the communication module 308 a message to be transmitted to the MS through message information collected from the paging controller.

The network communication module 302 of the paging controller receives ranging request information of the MS from the BS and provides the ranging request information to the paging control unit 300. Further, the network communication module 302 delivers to the BS ranging response information and paging advertisement information received from the paging control unit 300. The timer 304 measures a paging cycle of each MS under the control of the paging control unit 300.

More specifically, upon receiving a DREG-REQ message from the communication module 308, the message processor 306 of the BS processes the DREG-REQ message and then provides the DREG-REQ message to the paging controller. Under the control of the paging controller, the message processor 306 then generates a DREG-CMD message including the paging information and then provides the DREG-CMD message to the communication module 308. In addition, under the control of the paging controller, the message processor 306 generates an MOB_PAG_ADV message including an action code that enables a location update of the MS and then provides the MOB_PAG_ADV message to the communication module 308. Under the control of the paging controller, the message processor 306 generates an RNG-RSP message including a paging information TLV as shown in Table 4 above, for example, and then provides the RNG-RSP message to the communication module 308.

Figure 4:
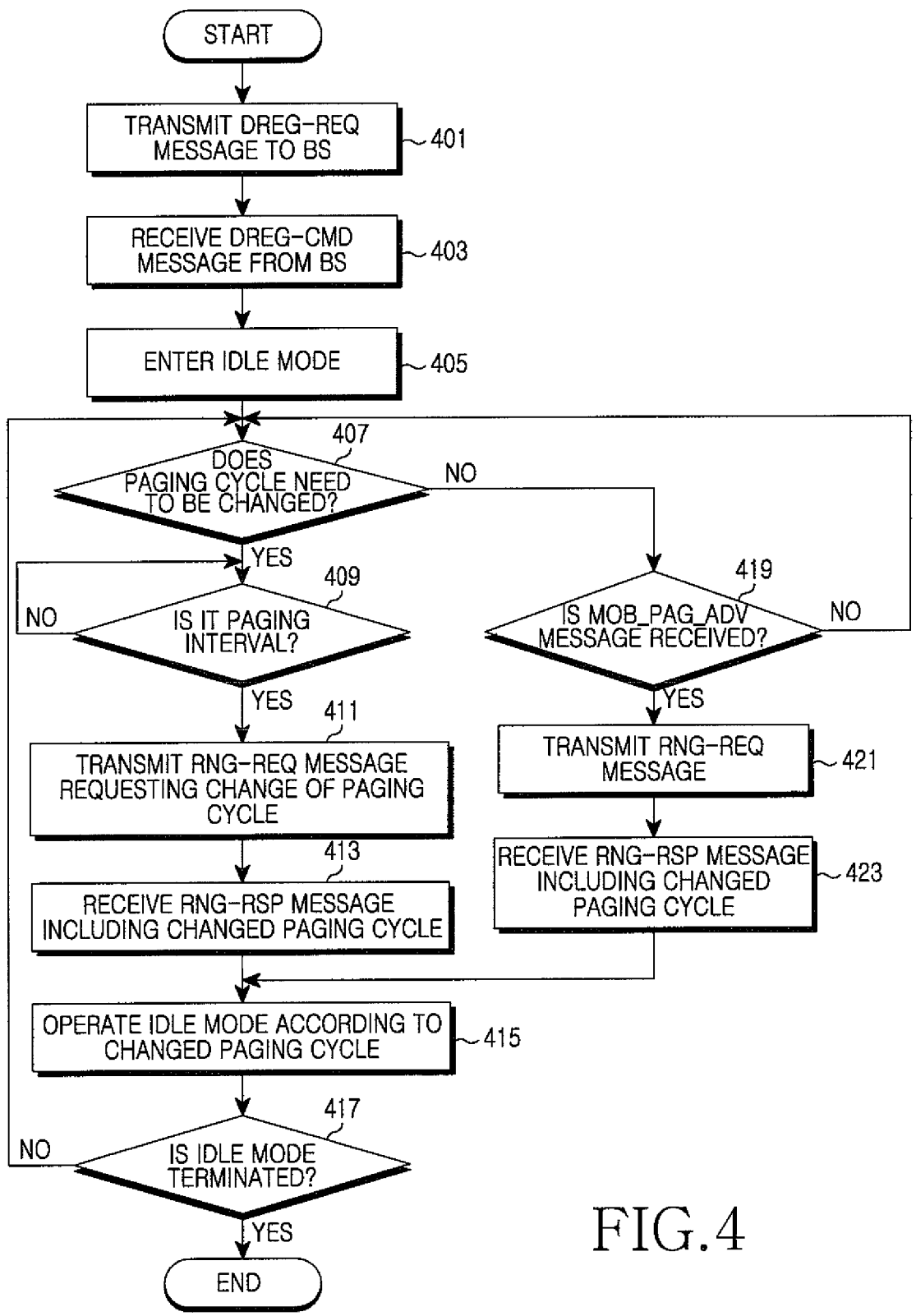
FIG. 4 is a flowchart illustrating a process of changing a paging cycle by an MS operating an idle mode in a wireless communication system according to an embodiment of the present invention.

FIG. 4 is a flowchart illustrating a process of changing a paging cycle by an MS while operating an idle mode in a wireless communication system according to an embodiment of the present invention. Herein, a BS includes a paging controller.

Referring to FIG. 4, when traffic is not generated for more than a predetermined time duration, the MS determines to enter the idle mode and transmits a DREG-REQ message to the BS in step 401. In step 403, the MS receives a DREG-CMD message including paging information (e.g., a paging cycle, a paging offset, and a paging group ID) from the BS. In step 405, the MS enters the idle mode and operates the idle mode according to the paging information included in the DREG-CMD message.

In step 407, the MS examines whether the paging cycle needs to be changed, i.e., the MS determines if a condition for changing the paging cycle is satisfied while operating the idle mode. For example, the need to change the paging cycle can be determined according to whether traffic is not generated while the paging cycle of the MS is repeated more than a certain number of times or whether there is a need to reduce power consumption. In addition, the condition for changing the paging cycle may be different from one MS to another.

If the paging cycle needs to be changed, in step 409, the MS examines whether a current time corresponds to a paging interval in the paging cycle or a paging unavailable interval in the paging cycle.

If the current time corresponds to the paging interval, in step 411, the MS generates an RNG-REQ message for requesting the change of the paging cycle and transmits the RNG-REQ message to the BS. As the RNG-REQ message, a conventional RNG-REQ message may be used by including the paging cycle request TLV (see Table 5 above) additionally provided according to the present invention or by including a bit which is defined for the purpose of the paging cycle request among the bits of the ranging purpose indication TLV (see Table 6 above).

In step 413, the MS receives an RNG-RSP message including the changed paging cycle from the BS during the paging interval. In step 415, the MS operates the idle mode according to the changed paging cycle. The changed paging cycle may be determined by the MS and be requested to the BS or may be determined by the BS and be reported to the MS. The paging cycle of the MS is changed within the same paging group.

However, if the paging cycle does not need to be changed, in step 419, the MS examines whether an MOB_PAG_ADV message for allowing location update is received from the BS during the paging interval. If the MOB_PAG_ADV message is not received, returning to step 407, and repeats the subsequent steps. However, if the MOB_PAG_ADV message is received, in step 421, the MS transmits to the BS an RNG-REQ message for location update during the paging interval. In step 423, the MS receives an RNG-RSP message including the changed paging cycle from the BS during the paging interval. In step 415, the MS operates the idle mode according to the change paging cycle.

In step 417, the MS examines whether the idle mode of the MS is terminated. If the idle mode is not terminated, the MS repeats the subsequent steps starting from step 407. If the idle mode is terminated, the procedure of FIG. 4 ends.

In the conventional wireless communication system supporting the idle mode of the MS, the MOB_PAG_ADV message is used to evaluate the existence of traffic of the MS or to evaluate a paging zone. The MOB_PAG_ADV message can be transmitted and received between the MS and the BS during the paging interval according to a process of operating the idle mode. Therefore, although not illustrated in FIG. 4, even when the paging cycle needs to be changed, the MS evaluates the existence of traffic by receiving the MOB_PAG_ADV message from the BS during the paging interval, or performs a basic action related to the idle mode such as paging zone evaluation.

Figure 5:
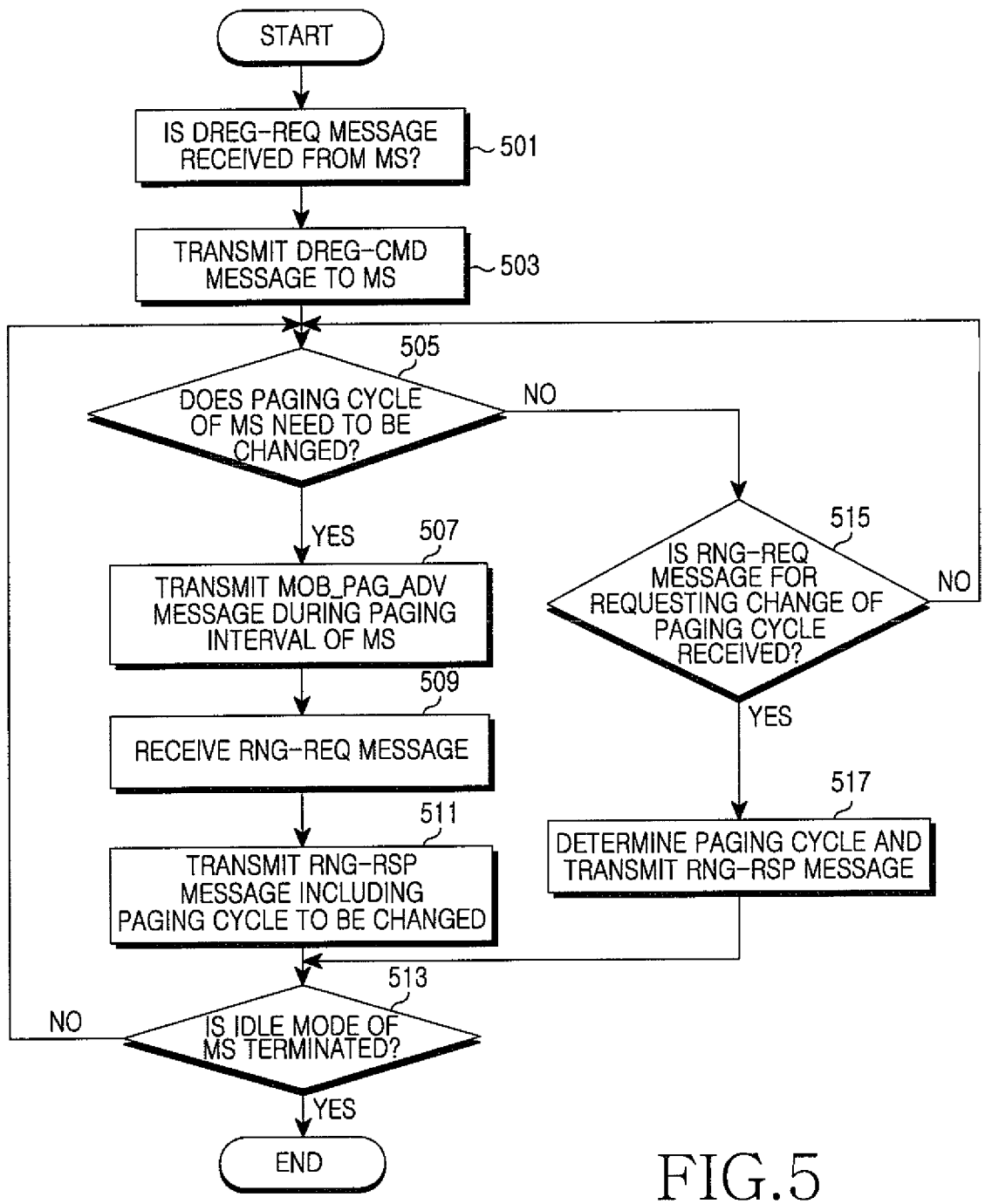
FIG. 5 is a flowchart illustrating a procedure of a BS for changing a paging cycle of an MS in an idle mode in a wireless communication system according to an embodiment of the present invention.

FIG. 5 is a flowchart illustrating a process of a BS for changing a paging cycle of an MS in an idle mode in a wireless communication system according to an embodiment of the present invention. Herein, it is assumed that the BS includes a paging controller.

Referring to FIG. 5, when a DREG-REQ message is received from a specific MS in step 501, the BS transmits a DREG-CMD message including paging information to the MS in step 503. Thereafter, the BS performs a de-registration process of the MS so that the MS is managed and operated as an MS that operates the idle mode.

In step 505, the BS examines whether the paging cycle needs to be changed, i.e., determines if the MS operating the idle mode satisfies a condition for changing the paging cycle. For example, the need to change the paging cycle can be determined according to whether traffic is not generated while the paging cycle of the MS is repeated more than a certain number of times or whether there is a need for effective resource management. In addition, the condition for changing the paging cycle may be different from one MS to another.

If the paging cycle needs to be changed, in step 507, the BS transmits, to the MS, an MOB_PAG_ADV message for requesting location update during a paging interval in the paging cycle of the MS. In step 509, the BS receives from the MS an RNG-REQ message for location update.

In step 511, the BS determines a paging cycle to be changed, transmits to the MS an RNG-RSP message including the determined paging cycle, and manages the MS by using the determined paging cycle. The determined paging cycle may be determined by the MS and be requested to the BS.

However, if the paging cycle does not need to be changed, in step 515, the BS examines whether an RNG-REQ message for requesting the change of the paging cycle is received. As the RNG-REQ message, a conventional RNG-REQ message may be used by including the paging cycle request TLV (see Table 5 above) additionally provided according to the present invention or by including a bit which is defined for the purpose of the paging cycle request among the bits of the ranging purpose indication TLV (see Table 6 above).

If the RNG-REQ message is not received, returning to step 505, the BS repeats the subsequent steps. However, if the RNG-REQ message is received, in step 517, the BS determines the paging cycle to be changed, transmits an RNG-RSP message including the determined paging cycle, and manages the MS by using the determined paging cycle. The determined paging cycle may be determined by the MS and be requested to the BS. Even if the received RNG-REQ message does not include a TLV for requesting the change of the paging cycle, the BS may change the paging cycle of the MS by transmitting to the MS the RNG-RSP message including the paging cycle to be changed.

In step 513, the BS examines whether the idle mode of the MS is terminated. If the idle mode is terminated, the procedure of FIG. 5 ends. However, if the idle mode is not terminated, returning to step 505, the BS repeats the subsequent steps.

In the conventional wireless communication system supporting the idle mode of the MS, the MS transmits the RNG-REQ message for location information update when a paging zone is changed, and the BS transmits the RNG-RSP message in order to evaluate the paging zone in which the MS is previously registered through the RNG-REQ message and in order to newly apply paging information in a new paging zone. Therefore, although not illustrated in FIG. 5, even when the MOB_PAG_ADV message for requesting the location information update is not transmitted, a relevant operation can be performed by receiving from the MS the RNG-REQ message for location information update.

Figure 6:
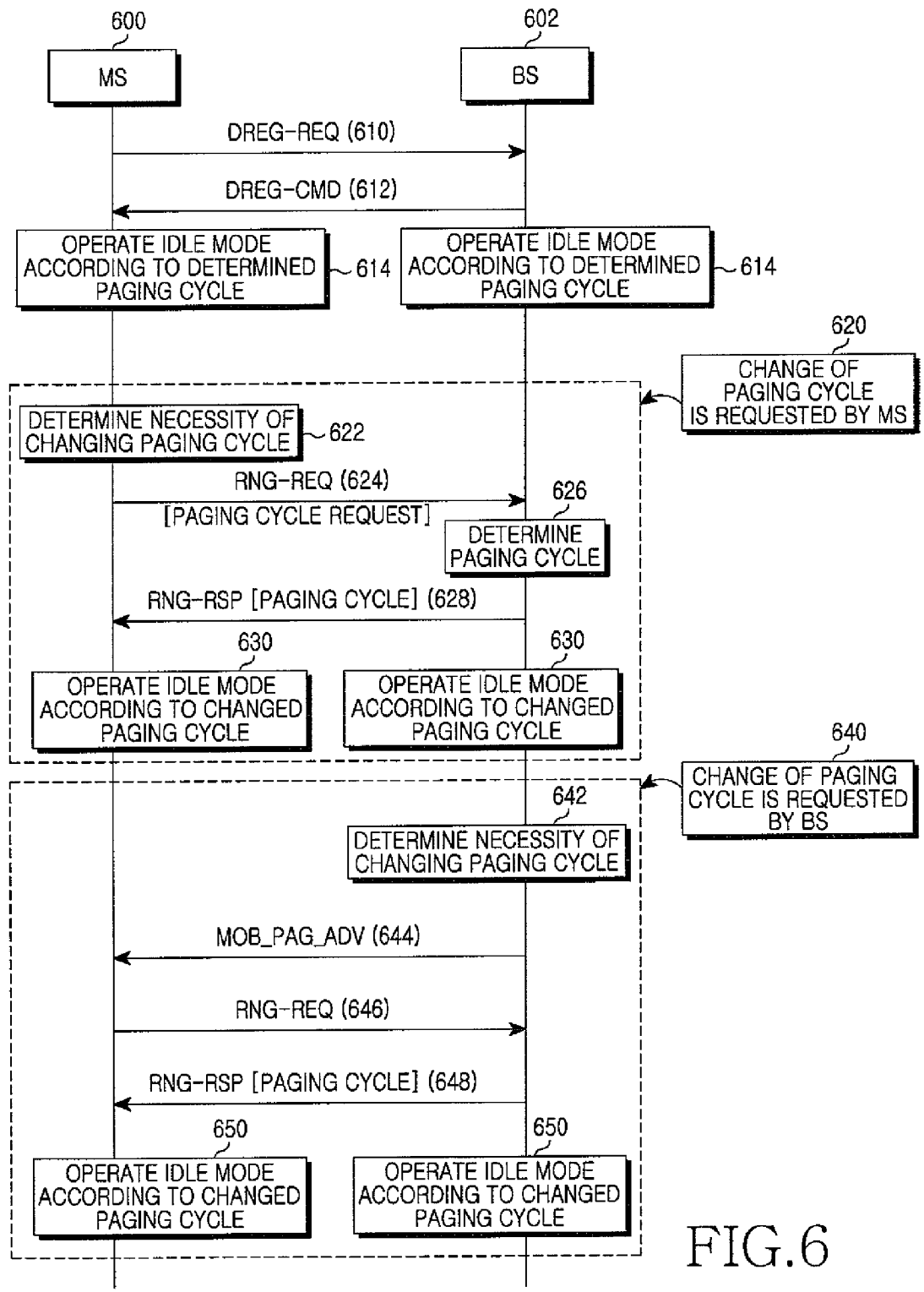
FIG. 6 is a diagram illustrating a signal flow for changing a paging cycle while operating an idle mode in a wireless communication system according to an embodiment of the present invention.

FIG. 6 is a diagram illustrating a signal flow for changing a paging cycle while operating an idle mode in a wireless communication system according to an embodiment of the present invention. Herein, it is assumed that a BS includes a paging controller.

Referring to FIG. 6, if there is no traffic for an MS 600 for a predetermined duration of time, the MS 600 transmits a DREG-REQ message to a BS 602 in step 610. The BS 602 transmits to the MS 600 a DREG-CMD message including paging information in step 612. The paging information may be a paging cycle, a paging offset, and a paging group ID, which are required to operate the idle mode of the MS.

In step 614, the MS 600 evaluates the paging information included in the DREG-CMD message and operates the idle mode according to the evaluated paging cycle. The BS 602 also operates and manages the idle mode of the MS according to the paging information in step 614. Thereafter, the MS 600 and the BS 602 periodically determine whether it is necessary to change the paging cycle used for operating the idle mode of the MS.

If the need to change the paging cycle is determined by the MS 600 and then the change of the paging cycle is requested from the BS 602 by the MS 600, the procedure proceeds to step 620 and the subsequent steps are performed.

In step 622, the MS 600 determines whether the paging cycle needs to be changed. If the paging cycle needs to be changed, in step 624, the MS 600 transmits to the BS 602 an RNG-REQ message for requesting the change of the paging cycle. As the RNG-REQ message, a conventional RNG-REQ message may be used by including the paging cycle request TLV (see Table 5 above) or by including a bit which is defined for the purpose of the paging cycle request among the bits of the ranging purpose indication TLV (see Table 6 above).

For example, assuming that a paging cycle A is assigned to a specific MS and no traffic is generated for more than a predetermined time duration, or assuming that it is determined to change the paging cycle A to a greater paging cycle because the paging cycle A has low efficiency in terms of power savings, to request the greater paging cycle to the BS, the MS may transmit to the BS an RNG-REQ message in which the paging cycle request TLV is set to a value greater than the current paging cycle A or may transmit to the BS an RNG-REQ message in which a bit is set to 1 wherein the bit is selected from bits of the ranging purpose indication TLV and is assigned to a paging cycle request bit.

Upon receiving the RNG-REQ message, in step 626, the BS 602 determines a paging cycle to be changed. In step 628, the BS 602 transmits to the MS 600 an RNG-RSP message including the determined paging cycle.

After receiving the RNG-RSP message from the BS 602, in step 630, the MS 600 operates the idle mode according to the changed paging cycle included in the RNG-RSP message.

However, if the need to change the paging cycle is determined by the BS 602 and then the paging cycle of the MS 600 is changed by the BS 602, the procedure proceeds to step 640 and the subsequent steps are performed.

In step 642, the BS 602 determines the need to change the paging cycle. If the paging cycle needs to be changed, in step 644, the BS 602 transmits to the MS 600 an MOB_PA-G_ADV message including an action code TLV for requesting location update, thereby enabling the MS 600 to perform network entry.

In step 646, the MS 600 transmits to the BS 602 an RNG-REQ message for location update. In step 648, the BS 602 transmits to the MS 600 an RNG-RSP message, which is a response message for the RNG-REQ message and which includes the paging cycle to be changed.

Upon receiving the RNG-RSP message from the BS 602, in step 650, the MS 600 operates the idle mode according to the changed paging cycle included in the RNG-RSP message.

According to the present invention, a paging cycle is flexibly changed by transmitting and receiving a ranging message while operating an idle mode of an MS in a wireless communication system. Therefore, resources can be more efficiently managed in comparison with the conventional method in which the paging cycle is changed after terminating the idle mode and then transitioning to a normal mode. In addition, the paging cycle can be effectively changed and controlled according to various conditions in consideration of power savings and rapid response to traffic.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the present invention is defined not by the detailed description of the invention but by the appended claims and their equivalents, and all differences within the scope should be construed as being included in the present invention.

What is claimed is:

1. A method of operating an idle mode of a Mobile Station (MS) in a wireless communication, the method comprising:
   determining, by the MS, a need to change a paging cycle by determining whether traffic is generated for a predetermined time duration while operating the idle mode according to a first paging cycle;
   transmitting, by the MS to a Base Station (BS), a request message for changing the paging cycle while operating the idle mode according to the first paging cycle;
   transmitting, by the BS to the MS, a response message including paging information to be changed; and operating a new idle mode, by the MS and the BS, according to a paging cycle included in the paging information transmitted and received while operating the idle mode, wherein the MS determines the need to change the paging cycle without receiving a request message for changing the paging cycle from the BS.

2. The method of claim 1, wherein transmitting the request message comprises transmitting paging cycle information for changing the paging cycle.

3. The method of claim 1, wherein the request message is used to request the BS to change the paging cycle by using ranging purpose indication paging cycle information among the paging cycle information included in the request message.

4. The method of claim 1, wherein the paging information includes at least one of the paging cycle, a paging offset, and a paging group identifier.

5. The method of claim 1, further comprising:
if the paging cycle needs to be changed, transmitting, by the MS, the request message.

6. The method of claim 1, further comprising:
determining, by the BS, if there is a need to change the paging cycle of the MS that is operating the idle mode;
transmitting, by the BS, an advertisement message for requesting location update to the MS; and
transmitting the request message by the MS to the BS in response to the advertisement message.

7. The method of claim 1, wherein the paging cycle to be changed includes a paging cycle determined and requested by the MS or a paging cycle determined by the BS.

8. A method of operating a Mobile Station (MS) in an idle mode in a wireless communication system, the method comprising:
determining a need to change a paging cycle by determining whether traffic is generated for a predetermined time duration while operating the idle mode according to a first paging cycle;
transmitting, to a Base Station (BS), a request message for changing the paging cycle while operating the idle mode according to the first paging cycle;
receiving, from the BS, a response message including paging information to be changed; and
operating a new idle mode according to a second paging cycle included in the paging information received while operating the idle mode,
wherein the MS determines the need to change the paging cycle without receiving a request message for changing the paging cycle from the BS.

9. The method of claim 8, wherein transmitting the request message comprises transmitting paging cycle information for changing the paging cycle.

10. The method of claim 8, wherein the request message is used to request the BS to change the paging cycle by using ranging purpose indication paging cycle information among the paging cycle information included in the request message.

11. The method of claim 8, wherein the paging information includes at least one of the paging cycle, a paging offset, and a paging group identifier.

12. The method of claim 8, further comprising:
if the paging cycle needs to be changed, transmitting the request message by the MS.

13. The method of claim 8, further comprising:
receiving, from the BS, an advertisement message for requesting location update; and
transmitting the request message in response to the advertisement message.

14. The method of claim 8, wherein the paging cycle to be changed includes a paging cycle determined and requested by the MS or a paging cycle determined by the BS.

15. A method of operating a Base Station (BS) that operates an idle mode of a Mobile Station (MS) in a wireless communication system, the method comprising:
receiving a request message for changing a paging cycle from the MS that is operating the idle mode according to a first paging cycle;
transmitting, to the MS, a response message including paging information indicating a second paging cycle to be changed; and
operating the idle mode of the MS according to the second paging cycle included in the paging information,
wherein the MS determines a need to change the paging cycle without receiving a request message for changing the paging cycle from the BS.

16. The method of claim 15, wherein receiving the request message comprises receiving paging cycle information for changing the paging cycle.

17. The method of claim 15, wherein the request message is used to request the BS to change the paging cycle by using ranging purpose indication paging cycle information among the paging cycle information included in the request message.

18. The method of claim 15, wherein the paging information includes at least one of the paging cycle, a paging offset, and a paging group identifier.

19. The method of claim 15, further comprising:
determining if there is a need to change the paging information of the MS that is operating the idle mode within a same paging zone; and
transmitting, to the MS, the response message including the paging information in order to change the paging information.

20. The method of claim 15, further comprising:
transmitting an advertisement message for enabling the MS to transmit the request message in order to change the paging cycle of the MS that is operating the idle mode; and
receiving the request message from the MS.

21. The method of claim 20, further comprising:
transmitting the advertisement message to the MS.

22. A Mobile Station (MS) apparatus for operating an idle mode in a wireless communication system, the apparatus comprising:
a controller for checking a condition for changing a paging cycle while operating the idle mode according to a first paging cycle, for controlling that a request message is to be transmitted to a Base Station (BS) according to the condition, checking paging information included in a response-message received from the BS, and for operating the idle mode according to a second paging cycle included in the paging information; and
a communication module for transmitting the request message to the BS under the control of the controller, for receiving the response message from the BS, and for providing the response message to the controller,
wherein the MS determines a need to change the paging cycle without receiving a request message for changing the paging cycle from the BS.

23. The apparatus of claim 22, wherein the request message comprises paging cycle information for changing the paging cycle.

24. The apparatus of claim 22, wherein the request message is used to request the BS to change the paging cycle by using ranging purpose indication paging cycle information among the paging cycle information included in the request message.

25. The apparatus of claim 22, wherein the paging information comprises at least one of the paging cycle, a paging offset, and a paging group identifier.

26. The apparatus of claim 22, wherein the controller, if the paging cycle needs to be changed, controls the request message for requesting the change of the paging cycle to be transmitted to the BS.

27. A Base Station (BS) apparatus for operating an idle mode of a Mobile Station (MS) in a wireless communication system, the apparatus comprising:

a message processor for providing a network apparatus with a request message received from the MS, while the MS is operating in the idle mode according to a first paging cycle, for receiving control information from the network apparatus, and for preparing a response-message including paging information indicating a second paging cycle to be changed, or an advertisement message to be delivered to the MS; and a communication module for transmitting and receiving messages to and from the MS, wherein the MS determines a need to change a paging cycle without receiving a request message for changing the paging cycle from the BS.

28. The apparatus of claim 27, wherein the request message comprises paging cycle information for changing the paging cycle.

29. The apparatus of claim 27, wherein the request message is used to request the BS to change the paging cycle by using ranging purpose indication paging cycle information among the paging cycle information included in the request message.

30. A network apparatus for operating an idle mode of a Mobile Station (MS) in a wireless communication system, the apparatus comprising:

a controller for determining to change paging information of the MS, which is operating the idle mode, according to a condition for changing a paging cycle or according to a request of the MS, and for operating the idle mode of the MS; and a network communication module for delivering information for transmitting an advertisement message to a Base Station (BS) in a paging group, wherein the MS determines a need to change the paging cycle without receiving a request message for changing the paging cycle from the BS.

31. The apparatus of claim 30, wherein the controller controls the advertisement message, which enables transmission of a request message, to be transmitted to the MS.

\* \* \* \* \*